Figure 2:
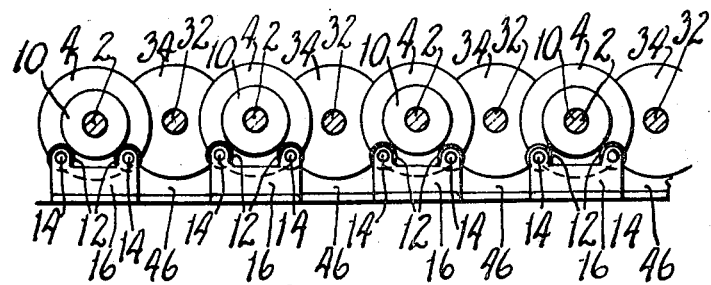

United States Patent [19]
Ball et al.

[11] 3,770,103
[45] Nov. 6, 1973

[54] TABLES

[75] Inventors: Allan Ball, Poole; Dennis Stubbs; William James Richmond, both of Sheffield, all of England

[73] Assignee: Davy and United Engineering Company Limited, Sheffield, England

[22] Filed: Feb. 9, 1972

[21] Appl. No.: 224,852

[30] Foreign Application Priority Data
Feb. 26, 1971 Great Britain ..................... 5,568/71

[52] U.S. Cl. ................. 198/127, 432/245, 432/246
[51] Int. Cl. ............................................. B65g 13/02
[58] Field of Search ...................... 198/127; 74/608, 74/609; 432/245, 246

[56] References Cited
UNITED STATES PATENTS

| | | | |
|---|---|---|---|
| 2,946,248 | 7/1960 | Neumann | 198/127 |
| 1,851,820 | 3/1932 | Dunbar | 198/127 |
| 1,048,328 | 12/1912 | Maize | 74/609 |
| 1,840,661 | 1/1932 | Fahrenwald | 198/127 |
| 1,425,499 | 8/1922 | Lewis | 198/127 |
| 1,703,943 | 3/1929 | Manker | 198/127 |
| 3,455,409 | 7/1969 | Clark | 74/608 |
| 1,992,466 | 2/1935 | Blythe | 432/245 X |
| 1,599,594 | 9/1926 | Sockman | 198/173 |

Primary Examiner—Evon C. Blunk
Assistant Examiner—Joseph E. Valenza
Attorney—Henry C. Westin

[57] ABSTRACT

A plate cooling bed consists of a number of parallel shafts on each of which are mounted a number of equal discs which support and transport the plate. The shafts have no axial bearings, and, instead, each shaft is supported by a number of secondary discs, which have a diameter less than that of the support discs, and which are engaged by pairs of rollers beneath the shafts. Each shaft is driven at its ends.

11 Claims, 8 Drawing Figures

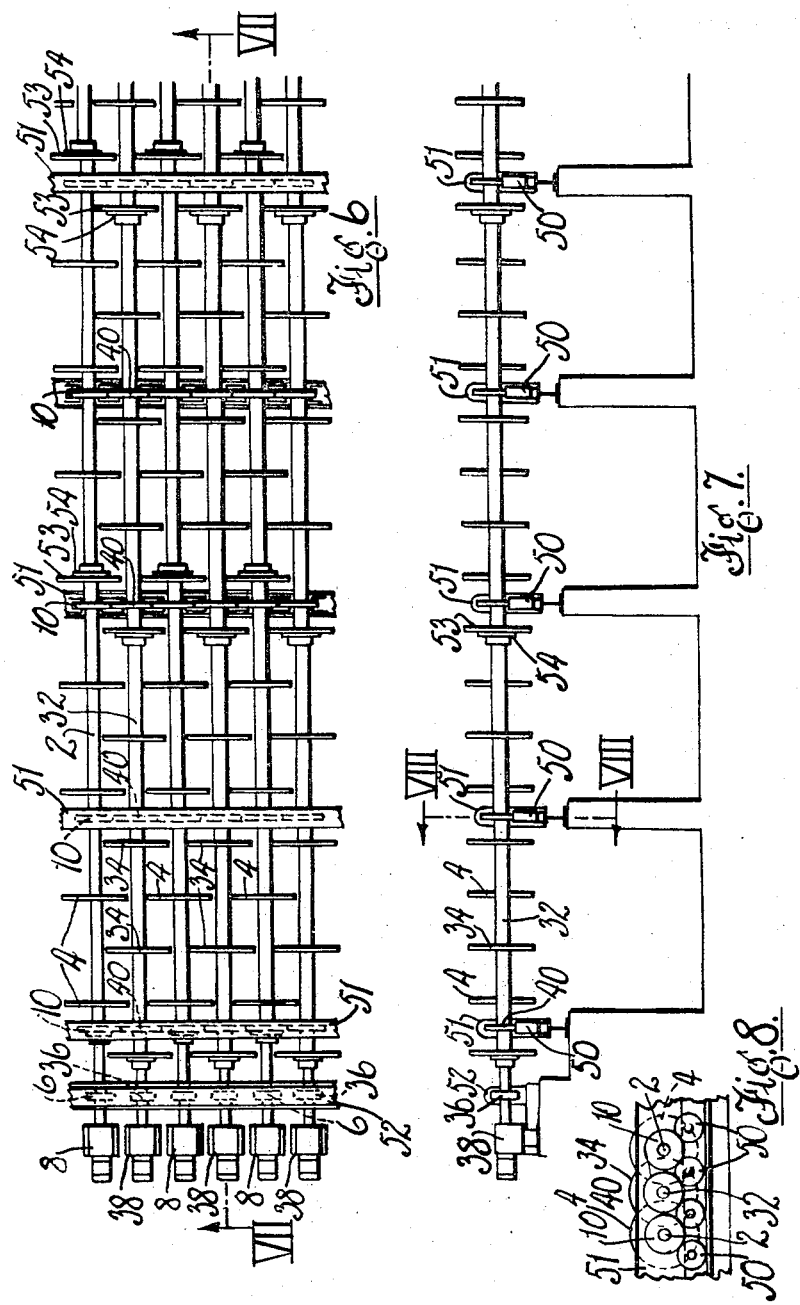

TABLES

This invention relates to transfer or cooling tables or beds for metal products and particularly for metal plates. The invention is concerned with that type of cooling table which is constituted by discs carried by and spaced axially along a series of shafts which are spaced apart transversely of their lengths. In that type of cooling table, the metal plates are supported on the discs and can be transferred along the table by driving the shafts.

Instead of carrying the shafts in bearings, it has been proposed to support the shafts by pairs of support rollers disposed below the level of the shafts and engaging and supporting some of the product support discs. While this arrangement was devised in order to avoid problems arising from overheating of axial bearings for the shafts by radiation from the hot metal plates on the table, we have found that it has the alternative disadvantage of transferring heat by conduction through the discs, which are in contact with the plates, to the support rollers and to their bearings, to the detriment of the bearings.

In the present invention, a transfer or cooling table or bed for metal products comprises a plurality of shafts spaced from one another in the transfer direction, each shaft carrying a plurality of substantially equal diameter product support discs spaced along the shaft and coaxial with the shaft, and, for the rotary support of each of at least ome of the shafts, a plurality of secondary some on the shaft having surfaces of revolution coaxial with the shaft, but separate from the support discs and with diameters intermediate the shaft diameter and the diameter of the support discs on the shaft, and a plurality of rollers arranged to engage the secondary members below the level of the shaft, and to support the shaft through the secondary members.

By the invention, the support rollers are brought out of direct contact with the product support discs and heating by conduction of the bearings for the rollers is reduced. For the same purpose the rollers themselves may be shrouded from heat radiation by hoods.

While each shaft may extend over the entire width of the bed, it is preferred to have a number of shorter coaxial lengths which may be optionally coupled together for rotation by a single drive.

Figure 1:
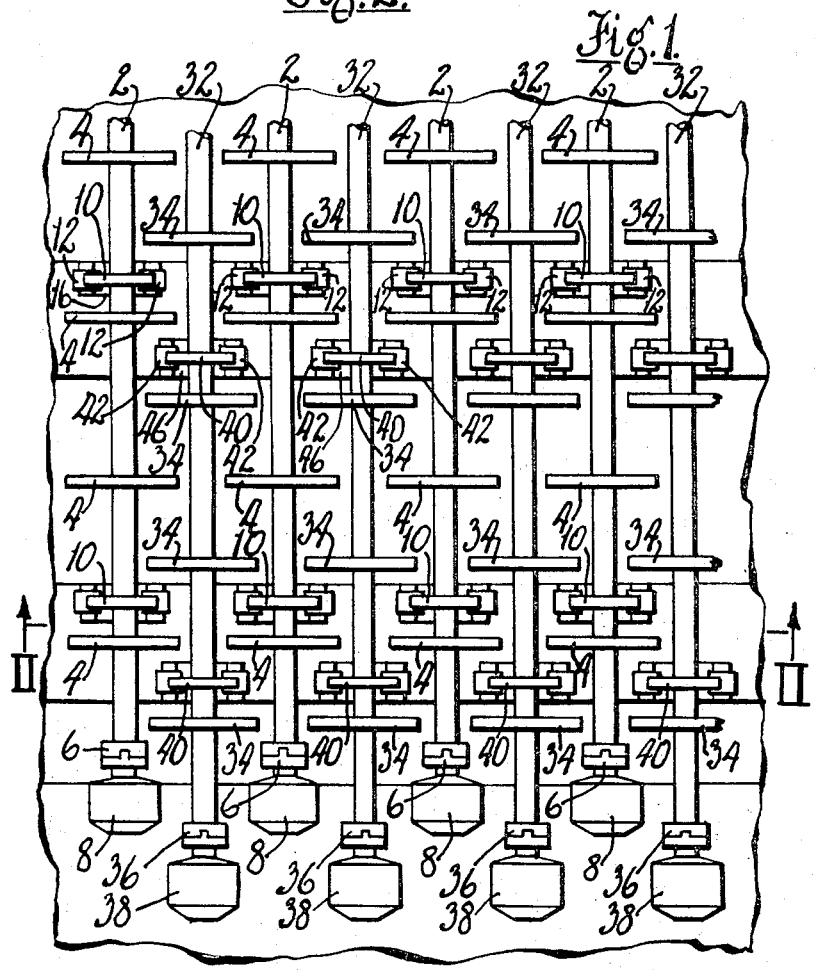
Figure 3:
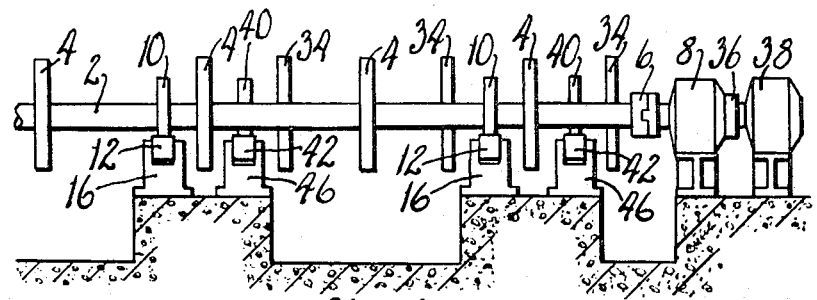
Figure 4:
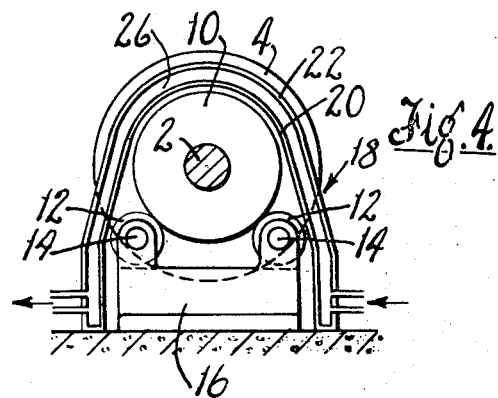
Figure 5:
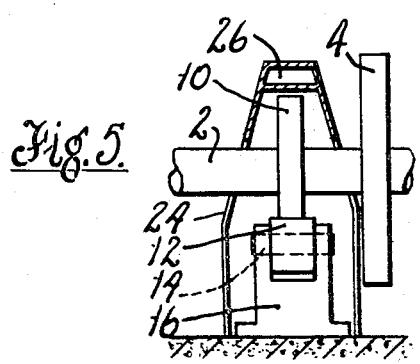

The invention will be more readily understood by way of example from the following description of two forms of transfer or cooling tables or beds in accordance therewith, reference being made to the accompanying drawings, in which FIG. 1 is a plan view of part of a cooling table or bed installation, FIG. 2 is a view in section along the line II—II on FIG. 1, FIG. 3 is a side elevation of part of the cooling bed of FIG. 1, FIGS. 4 and 5 are fragmentary views of part of the cooling bed illustrating a cooling system for parts of the bed, FIG. 6 is a plan view of a modified form of cooling bed, and FIG. 7 and 8 are respectively sections on the lines VII—VII of FIG. 6 and VIII—VIII of FIG. 7.

The cooling bed illustrated in FIGS. 1 to 5 comprises a first series of rotatable shafts 2 to which are coaxially secured plate support and transporting dics 4. The shafts are rotated, through a coupling 6, by means of individual motors 8, which may be electric or hydraulic motors. Between the shafts 2 and parallel therewith are further shafts 32 which carry support discs 34 staggered axially relative to the discs 4. The shafts 32 are driven through couplings 36 by motors 38.

Each shaft 2 additionally carries secondary members illustrated as further discs 10, which are somewhat smaller in diameter than the plate supporting discs 4, and each of these discs 10 is supported on a pair of rollers 12 rotatably mounted on pins 14 in brackets 16 which are secured to the floor area beneath the bed. Similarly the shafts 32 have smaller diameter discs 40 which are shown as staggered axially relative to the discs 10 and which are supported on rollers 42 rotatably mounted on pins 44 (not shown) in brackets 46.

It will be clear from the drawings that, by supporting the shaft assembly on the rollers 12, 42 through the secondary discs 10, 40, the bearings for the rollers 12, 42 are removed a substantial distance away from any radiation of heat from any hot plate sitting on top of the discs 4. Furthermore, because the support discs 4, 34 are not themselves supported on the rollers 12, 42, the heat carried by conduction to the bearings of the roller is substantially less than would otherwise be the case.

To assist in obviating any adverse effect on the bearings by radiated heat from the plate, a suitable hood arrangement may be provided over parts of the cooling bed and such an arrangement is illustrated in FIGS. 4 and 5. A hood 18, comprising an inner skin 20 and an outer skin 22, is mounted over each disc 10 or 40 and its associated rollers 12 or 42 and bracket 16 or 46. The hood has side plates 24 as seen in FIG. 5 and these are slotted to enable the hood to be placed over the shafts, 2, 32. Air or cooling water may be fed through the passage 26 formed between the inner and outer skins 20, 22 of the hood and, furthermore, at least one of the faces of these skins may be highly finished to provide a heat reflecting surface.

FIGS. 1 to 3 illustrate a part only of the bed which extends beyond that shown in both the axial direction of the shafts 2, 32 and in the transfer direction at right angles to the shafts. The shafts 2, 32 may extend over the entire width of the bed in the axial direction, but it is preferred to have a series of relatively short length coaxial shafts which can be coupled or uncoupled at will. In this way the effect of heat distortion of the shafts is reduced, while the width of bed driven by the motors 8, 38 can be varied by selective operation of the couplings. The couplings may be flexible couplings or each of at least some of the couplings may be constituted by discs similar to the discs 10, 40 but secured at the adjacent ends of the shafts and bolted together.

Various modifications of the construction illustrated in FIGS. 1 to 5 are of course possible and some of those modifications are shown in FIGS. 6 to 8 which illustrates a preferred form of cooling bed.

The bed of FIGS. 6 to 8 has the support discs 4 or 34 on each shaft 2 or 32 staggered axially relative to the support discs 34 or 4 on adjacent shafts, as in FIGS. 1 to 5, but the secondary discs 10, 40 are aligned on all shafts 2 or 32 in the direction of transfer i.e. in the direction at right angles to the shafts. In each line of secondary discs and between each pair of adjacent shafts 2, 32, there is a single support roller 50 below the level of the shafts, to engage and support the secondary discs on the shafts at each side. By aligning the discs 10, 40 in this way the number of support rollers 50 is almost halved relative to the arrangement of FIGS. 1 to 5.

A single hood 51 extending the full length of the bed in the transfer direction encloses each line of secondary discs 10, 40 and the co-operating support rollers 50 in a tunnel through which cooling air is passed continuously. The hood cuts off from the discs 10, 40 and their rollers 50 heat radiated from any supported plate while the air flow through the tunnel dissipates heat that may find its way by conduction through the discs 4, 34, shafts 2, 32 and the discs 10, 40 to the rollers 50. In this way the bearings for the rollers 50 are prevented from overheating.

The couplings 6, 36 are also aligned in the transfer direction and are enclosed in a common tunnel 52 through which cooling air is passed.

In FIGS. 6 and 7, the shafts are shown as made up of short shaft lengths which are coupled together end to end by couplings, each of which consists of a disc 53 of the same diameter as the support discs 4, 34 secured to the end of one shaft length and bolted or otherwise attached to another disc 54 secured to the adjacent end of the next shaft length.

We claim:

1. A transfer or cooling table or bed for metal products comprising a plurality of shafts spaced from one another in the transfer direction, each shaft carrying a plurality of substantially equal diameter product support discs spaced along the shaft and coaxial with the shaft, and, for the rotary support of each of the shafts, a plurality of secondary members on the shaft having surfaces of revolution coaxial with the shaft, but spaced separate from the support discs and with diameters intermediate the shaft diameter and the diameter of the support discs on the shaft, a plurality of rollers arranged to engage the secondary members below the level of the shaft, and to support the shaft through the secondary members, and means for supporting said plurality of rollers.

2. A table or bed according to claim 1 in which the support discs of each shaft are staggered in the axial direction relative to the support discs of adjacent shafts.

3. A table or bed according to claim 2 in which the secondary members of each shaft are staggered axially relative to the secondary members of adjacent shafts, and each secondary member is supported by a pair of support rollers.

4. A table or bed according to claim 2 in which the secondary members of each shaft are aligned with the corresponding secondary members of adjacent shafts and each support roller, except the end rollers in the transfer direction, engages and part-supports a secondary member on two adjacent shafts.

5. A table or bed according to claim 1 in which each secondary member is a disc having a diameter less than that of the support discs on the same shaft.

6. A table or bed according to claim 1 in which at least some of the secondary members are hooded against radiated heat.

7. A table or bed according to claim 6 in which each of at least some of the secondary members is enclosed in a double-walled cooled hood.

8. A table or bed according to claim 4 in which a number of secondary members which are aligned in the transfer direction are enclosed in a common hood.

9. A table or bed according to claim 8 in which the common hood includes means for forming a duct extending in the transfer direction for the passage of cooling gas.

10. A table or bed according to claim 1 in which each shaft is made up of two or more shaft lengths which are coupled together end to end.

11. A table or bed according claim 1 in which each of the shafts is driven at an end by an independent motor.

* * * * *

UNITED STATES PATENT OFFICE
CERTIFICATE OF CORRECTION

Patent No. 3,770,103          Dated November 6, 1973

Inventor(s) Allan Ball, et al.

It is certified that error appears in the above-identified patent and that said Letters Patent are hereby corrected as shown below:

Column 1, line 30, "one" should read -- some --;

line 31, "some" should read -- members --;

line 45, insert -- shaft -- after "coaxial" and before "lengths".

Column 4, line 35, insert -- to -- after "according" and before "claim 1".

Signed and sealed this 30th day of April 1974.

(SEAL)
Attest:

EDWARD M. FLETCHER, JR.          C. MARSHALL DANN
Attesting Officer                   Commissioner of Patents